3,215,651
HYDRAZINE-FORMALDEHYDE AS A REINFORCING AGENT FOR RUBBER LATEX FOAM
Balachandra Chakkingal Sekhar and Samuel Norman Angove, Kuala Lumpur, Malaya, assignors to The Rubber Research Institute of Malaya, Kuala Lumpur, Malaya, a body corporate
No Drawing. Filed Aug. 24, 1962, Ser. No. 219,121
Claims priority, application Great Britain, Aug. 25, 1961, 30,813/61
8 Claims. (Cl. 260—2.5)

This invention is for improvements in or relating to the reinforcement of rubber and is directed to the reinforcement of natural and synthetic rubbers in latex form.

Techniques for reinforcing both natural and synthetic rubber in the dry form are very well known and are practised in the rubber industry. These techniques are broadly of two kinds involving (1) the introduction of reinforcing fillers physically into the rubber matrix by mastication or co-precipitation and (2) the introduction of a chemically-grafted secondary polymer into the rubber molecules. Both these methods have been shown to be capable of effecting very little reinforcement of rubber in latex form. Among fillers, it is known that mica at a concentration of 20 to 30 parts by weight per 100 parts of rubber in the latex gives a small increase in the compression modules of foam rubbers. Graft latices have shown only marginal improvements because only small concentrations of secondary polymer can be introduced without producing cracks in films or the collapse of foam rubbers produced from such latices. Attempts have also been made to form condensation resins in situ in latex using an acid catalyst but, in all cases, the product has been a gelled solid. Resin reinforcement has, therefore, only been used to produce a reinforced dry rubber and has not hitherto been successfully applied to products made from latex.

Natural and synthetic rubber latices in concentrated liquid form are extensively used to make foam rubber products and they are also used for making dipped goods in considerable quantities and there is an unsatisfied demand for a technique which will make it possible to enhance the physical properties of rubber goods prepared from latex. It is an object of the present invention to achieve the satisfactory reinforment of these latices.

According to the present invention therefore there is provided a process for the reinforcement of natural and synthetic rubber latices which comprises reacting hydrazine with formaldehyde in situ in the latex. The process of the invention results in the production of a hydrazine-formaldehyde resin intimately associated with the dispersed polymers of the latex which resin effects a reinforcement of the latex which makes it possible to produce foam rubbers of enhanced compression modulus and films of increased modulus and strength from Hevea latex concentrate; the effect obtainable with latices made from synthetic elastomers is less marked than with natural rubber latex which may be treated in its various conventional forms, e.g. field latex, concentrated latex and latices containing preservatives such as ammonia.

The process of the present invention can be carried out in the latex at room temperature without any catalysts and up to concentrations of the resin of 5% by weight of the rubber solids content of the natural latex, the latex remains fluid. The hydrazine is most conveniently used in the form of its hydrate since if a salt of hydrazine were employed it would have to be converted to hydrazine by the action of a strong base which may involve an undesirable dilution of the latex.

The following tables show the results obtained by the addition of varying quantities of aqueous solutions of hydrazine hydrate and formaldehyde to a field latex and to an ammoniated concentrated latex.

*Table I.—Freshfield latex—30% dry rubber content*

| Latex, gms. | Aqueous Hydrazine Hydrate, 56% w./v. gms. | Aqueous Formaldehyde, 38% w./v. gms. | Temp. rise, °C. | Nature of Product |
|---|---|---|---|---|
| 100 | 0.6 | 1.2 | 5 | Liquid. |
| 100 | 1.5 | 3.0 | 10 | Do. |
| 100 | 3.0 | 6.0 | 30 | Do. |
| 100 | 6.0 | 12.0 | 50 | Solid. |
| 100 | 9.0 | 18.0 | 55 | Do. |

*Table II.—Centrifuged concenrated latex—60% dry rubber content, 0.7% ammoniated*

| Latex, gms. | Aqueous Hydrazine Hydrate, 56% w./v. gms. | Aqueous Formaldehyde, 38% w./v. gms. | Temp. rise, °C. | Nature of Product |
|---|---|---|---|---|
| 100 | 1.2 | 7.3 | 5 | Liquid. |
| 100 | 3.0 | 10.9 | 20 | Do. |
| 100 | 6.0 | 16.9 | 50 | Very thick. |

The resin-forming reaction between hydrazine hydrate and formaldehyde to yield a polymer involves one molecule of hydrazine hydrate and two molecules of formaldehyde and one part by weight of the hydrazine hydrate yields 1.12 parts of polymer so that it can be seen from the above Tables that if the concentration of resin is not appreciably greater than 5% by weight of the dry rubber content, the final product is a latex; stabilization of the latex by the addition of a stabilizing soap is required to enable higher concentrations of the resin to be incorporated in the latices but even when so stabilized the latex will gel at a resin content of 8% and since the resin-forming reaction leads to the production of water there is an undesirable degree of dilution of the latex at resin contents above 5%, particularly when a natural rubber latex is to be used for the production of foam rubber.

The amounts of formaldehyde and hydrazine hydrate used should be in the ratio of from 6:5 up to 2:1 by weight but where the latex contains ammonia it is necessary to use an excess of formaldehyde to make allowance for the production of hexamethylene-tetramine by the interaction of the formaldehyde with the ammonia; the amount of excess formaldehyde should be 2.65 gms. for each gram of ammonia present. Thus in Table II each amount of formaldehyde solution quoted includes 4.9 gms. extra to make allowance for reaction with the ammonia.

In the case of latices made from synthetic elastomers, however, the soaps or emulsifying agents used in their production which remain in the latex allow resin contents as high as 20% based on the solids contents before any destabilization occurs.

Although the amount of resin formed is small based on the rubber content of Hevea latex concentrates, the resulting latex produces foam rubbers of enhanced compression modulus and also films of greater strength and tear properties. The improvement in properties is evident in latices for use in making dipped goods at resin contents as low as 0.15% but preferably at least 0.25 to 0.5% by weight of resin based on the dry rubber content is used whilst for the production of foam rubbers the preferred minimum amount of resin is 0.75%. In the case of synthetic rubber latices, the improvement in the compression modulus of foam rubbers and in the strength in films is not as great as equivalent concentrations of resin as is obtainable with the natural rubber latices.

The following examples illustrate the manner in which the present invention may be carried into effect, percentages being quoted by weight unless otherwise specified.

EXAMPLE 1

1,000 gm. lots of Hevea latex concentrate having a dry rubber content of 60%, ammoniated to 0.7%, were treated with increasing concentrations of a 56% w./v. aqueous solution of hydrazine hydrate. To these latices proportionate quantities of formaldehyde as a 38% w./v. aqueous solution were mixed in and the latices allowed to stand for 2 hours. From the resulting latices, foam rubbers and vulcanized films were prepared. The physical properties obtained are given in the tables below:

*Table III.—Foam rubber*

| Percent Concentration of resin based on rubber content | Density D, g. cm.$^{-3}$ | Compression Modulus (C), gms./cm.$^2$ | $\frac{C}{D^{2.5}}$ | Percent weight saving at equivalent compression Modulus |
|---|---|---|---|---|
| 0 | 0.113 | 82.7 | 19.2 | |
| 1.25 | 0.108 | 92.4 | 24.3 | 4.4 |
| 1.9 | 0.109 | 98.6 | 25.0 | 7.4 |
| 3.1 | 0.114 | 117.5 | 26.8 | 15.8 |

Recipe for foam rubber used—
Rubber _____ 100.0
Sulphur _____ 2.5
Zinc diethyl dithiocarbamate _____ 0.8
Zinc mercaptobenzthiazole _____ 0.8
Antioxidant _____ 1.0
Potassium oleate _____ 1.5
Zinc oxide _____ 5.25
Diphenyl guanidine _____ 0.25
Ammonium chloride _____ 0.25
Cationic soap _____ 0.20
Sodium silicofluoride _____ 1.60
Cure 30 minutes at 100° C. open steam.

Figures in the last column of Table III give the percent weight saving at equivalent levels of compression modulus for the resin incorporated samples calculated from the relationship $$\frac{\text{Compression modulus}}{(\text{density})^{2.5}} = \text{Compression factor at equivalent density}$$

The relationship $$\frac{C}{D^{2.5}}$$

reduces the compression modulus figures to a factor at equivalent densities. (Ref.: P. R. Cyss et al., Proceedings Natural Rubber Research Conference (Kuala Lumpur), 718 (1960).)

*Table IV.—Films*

| Concentration of resin percent on rubber | Modulus, kgms./cm.$^2$ | | Tensile Strength, kgms./cm.$^2$ | Elongation at Break, percent | Tear Strength, kgms./cm.$^2$ |
|---|---|---|---|---|---|
| | 300% | 600% | | | |
| 0 | 8.2 | 32.1 | 285 | 923 | 64.5 |
| 1.25 | 11.8 | 58.1 | 285 | 918 | 73.5 |
| 1.9 | 15.0 | 75.3 | 362 | 925 | 100 |
| 3.1 | 16.8 | 95.8 | 372 | 883 | 139 |

The valucanizing recipe used for films was 1 part of sulphur, 1 part of zinc oxide and 1 part of zinc diethyl dithiocarbamate by weight per 100 parts of rubber.

The fatigue loss and ageing properties of the foams were very little different between the control and treated samples. The ageing properties and colour of the resin-containing films were in no way inferior to those of the control.

EXAMPLE 2

Hevea latex concentrate of a dry rubber content of 60%, ammoniated to 0.7%, and stored for five months was divided into lots and treated as in Example 1, but the range of concentration of resin formed based on rubber contents was increased from 0.16% to 3.1%. The properties of the resulting foam rubbers and vulcanized films are given in Tables V and VI.

*Table V.—Foam rubber*

| Percent Concentration of resin based on rubber content | Density D, g. cm.$^{-3}$ | Compression Modulus (C), gms./cm.$^2$ | $\frac{C}{D^{2.5}}$ | Percent weight saving at equivalent compression Modulus |
|---|---|---|---|---|
| 0 | 0.1084 | 70 | 18.3 | |
| 0.16 | 0.1052 | 80 | 22.4 | 5.2 |
| 0.62 | 0.1092 | 84 | 21.3 | 7.1 |
| 1.9 | 0.1098 | 99 | 25 | 14.1 |
| 3.1 | 0.1100 | 120 | 29.8 | 23.4 |

*Table VI.—Films*

| Concentration of resin percent on rubber | Modulus, kgms./cm.$^2$ | | Tensile Strength, kgms./cm.$^2$ | Elongation at Break, percent | Tear Strength, kgms./cm.$^2$ |
|---|---|---|---|---|---|
| | 300% | 600% | | | |
| 0 | 10.2 | 36.3 | 265 | 888 | 62 |
| 0.16 | 11.9 | 56.0 | 335 | 888 | 62 |
| 0.62 | 13.6 | 60.4 | 341 | 862 | 64 |
| 1.9 | 13.9 | 65.0 | 310 | 889 | 80 |
| 3.1 | 15.5 | 82.6 | 326 | 848 | 112 |

Example 3

High solids styrene/butadiene latex (62% solids) was mixed with varying concentrations of hydrazine hydrate and proportionate amounts of formaldehyde. Physical properties of foam rubbers from the resulting latex are given in the following table:

*Table VII.—Foam rubber*

| Percent Concentration of resin based on rubber content | (D) Density, g. cm.$^{-3}$ | Compression Modulus, gms./cm.$^2$ (C) | $\frac{C}{D^{2.5}}$ |
|---|---|---|---|
| 0 | 0.0973 | 50.6 | 17.2 |
| 1.9 | 0.0857 | 38.5 | 17.9 |
| 3.1 | 0.0840 | 40.0 | 19.4 |
| 6.2 | 0.0920 | 52.0 | 21.2 |

Foam rubber recipe used—
Latex _____ 100.0
Sulphur _____ 2.0
Zinc diethyl dithiocarbamate _____ 1.0
Zinc mercaptobenzthiazole _____ 1.0
Antioxidant _____ 1.0
Trimene base _____ 1.0
Potassium oleate _____ 1.0
Sodium silicofluoride _____ 4.5
Zinc oxide _____ 3.0
Cure 30 minutes at 100° C. open steam.

The process of the invention can be carried out effectively in other synthetic elastomer latices such as latices of acrylonitrile/butadiene and chloroprene rubber but the improvements obtained are not as great as in natural rubber latex. The invention is also effective in its application to blends of natural and synthetic latices and to latices containing conventional fillers.

The reaction of hydrazine and formaldehyde in the latex is conveniently carried out by using the commercially available 56% hydrazine hydrate solution and formalin (38% formaldehyde). This inevitably causes dilution of the concentrated latices. If this dilution is undesirable the reaction can be effectively carried out by bubbling formaldehyde gas through the latex in which the required amount of pure hydrazine hydrate has been dissolved.

It is possible that some natural rubber latex concentrates which contain ammonia as a preservative may exhibit a tendency to become unstable during the addition of formaldehyde and we have found that any such tendency towards instability can be effectively counteracted by the addition of sodium or potassium hydroxides, in amounts of up to 0.2% by weight calculated upon the rubber solids of the latex, prior to the addition of formaldehyde to the latex concentrate.

We claim:

1. A process for the reinforcement of a rubber latex selected from the group consisting of (a) natural rubber latices and (b) synthetic rubber latices which are selected from the group consisting of rubbery polymers and copolymers of conjugated diolefinic hydrocarbons which comprises adding to the latex for in situ reaction therein hydrazine and formaldehyde in an amount sufficient to form a hydrazine-formaldehyde resin in an amount which is from 0.15% to 5% by weight of the rubber solids content of said latex in the case of natural rubber latices and from 0.15% to 20% by weight of the rubber solids content of said latex in the case of the synthetic rubber latices.

2. A process as in claim 1 wherein the proportions of formaldehyde to hydrazine lie within the ratios between 6:5 and 2:1 by weight of the solids content of said latex.

3. A process for the reinforcement of a natural rubber latex which comprises adding to the latex for in situ reaction therein hydrazine and formaldehyde in the mole ratio of at least 2:1 in amount sufficient to form a hydrazine-formaldehyde resin in an amount which is from 0.15% to 5% by weight of the rubber solids content of the said latex.

4. A process for the reinforcement of a synthetic rubber latex which is a member selected from the group consisting of polymers and copolymers of conjugated diolefinic hydrocarbons which comprises adding to the latex for in situ reaction therein hydrazine and formaldehyde in a mole ratio of at least 2:1 in an amount sufficient to form a hydrazine-formaldehyde resin in an amount which is from 0.15% to 20% by weight of the rubber solids content of the said latex.

5. A process for the reinforcement of a rubber latex selected from the group consisting of (a) natural rubber latices and (b) synthetic rubber latices which are selected from the group consisting of polymers and copolymers of conjugated diolefinic hydrocarbons which comprises adding hydrazine to the latex and thereafter adding to the mixture obtained an amount of formaldehyde equivalent to at least a two to one molar ratio with respect to the hydrazine to effect an uncatalized reaction forming a hydrazine-formaldehyde resin in an amount which is from 0.15% to 5% by weight of the rubber solids content of the said latex in the case of the natural rubber latex and from 0.15% to 20% by weight of the rubber solids content of the said latex in the case of the synthetic rubber latices.

6. In a foamed rubber article which is produced by combining a natural rubber latex with a vulcanizing agent and a blowing agent to produce a foamed rubber, the improvement wherein the natural rubber latex contains from 0.15% to 5% by weight of the rubber solids content thereof of a hydrazine-formaldehyde resin formed in situ therein.

7. In a vulcanized film of reinforced rubber produced by dipping a form into a natural rubber latex containing a vulcanizing agent and subsequently vulcanizing the film of latex on said form, the improvement wherein the natural rubber latex contains from 0.15% to 5% by weight of the rubber solids content thereof of a hydrazine-formaldehyde resin formed in situ therein.

8. A natural rubber latex containing from 0.15% to 5% by weight of the rubber solids thereof of a hydrazine-formaldehyde resin formed in situ therein.

References Cited by the Examiner

UNITED STATES PATENTS

| | | | |
|---|---|---|---|
| 2,161,808 | 6/39 | Finlayson et al. | 260—72 |
| 2,495,097 | 1/50 | Green et al. | 260—723 |
| 2,845,400 | 7/58 | Rudner | 260—69 |
| 2,856,316 | 10/58 | Van Gils | 260—2.5 |

FOREIGN PATENTS 542,034   6/57   Canada.

MURRAY TILLMAN, *Primary Examiner.*

DONALD E. CZAJA, *Examiner.*